United States Patent [19]

Hintz et al.

[11] Patent Number: 5,100,923
[45] Date of Patent: Mar. 31, 1992

[54] PREPARATION OF EXPANDABLE STYRENE POLYMERS

[75] Inventors: Hans Hintz, Ludwigshafen; Uwe Guhr, Gruenstadt; Klaus Hahn, Kirchheim, all of Fed. Rep. of Germany

[73] Assignee: BASF Aktiengesellschaft, Ludwigshafen, Fed. Rep. of Germany

[21] Appl. No.: 606,313

[22] Filed: Oct. 31, 1990

[30] Foreign Application Priority Data

Nov. 3, 1989 [DE] Fed. Rep. of Germany ....... 3936595

[51] Int. Cl.$^5$ ................................................ C08J 9/16
[52] U.S. Cl. ...................................... 521/56; 521/146
[58] Field of Search ........................... 521/56, 146

[56] References Cited

U.S. PATENT DOCUMENTS

| | | |
|---|---|---|
| 2,744,291 | 5/1956 | Stastny et al. ................ 521/56 |
| 2,888,410 | 5/1959 | Buchholz ........................ 521/56 |
| 3,468,820 | 9/1969 | Buchholz et al. ............. 521/56 |

OTHER PUBLICATIONS

Kirk-Othmer Encyclopedia of Chemical Technology, 3rd Ed., vol. 23 (1983) pp. 967–969, 977.
Hengstenberg et al., Makromole Rulare Chemie, vol. 7 (1951) pp. 256 and 257.

*Primary Examiner*—Morton Foelak
*Attorney, Agent, or Firm*—Oblon, Spivak, McClelland, Maier & Neustadt

[57] ABSTRACT

In the preparation of expandable styrene polymers by polymerizing styrene, if desired together with up to 50% by weight of other monomers, in aqueous suspension with addition of a $C_3$- to $C_6$-hydrocarbon as blowing agent and, if desired, conventional additives in effective amounts before, during or after the polymerization, foaming is reduced if the aqueous phase contains from 0.05 to 0.3% by weight of polyvinylpyrrolidone having a K value of from 100 to 150 as protective colloid.

2 Claims, No Drawings

PREPARATION OF EXPANDABLE STYRENE POLYMERS

The present invention relates to a process for the preparation of expandable styrene polymers in which foaming during the preparation is reduced and the internal water content of the styrene polymers is increased.

It is known to prepare expandable styrene polymers by suspension polymerization in the presence of poly-N-vinylpyrrolidone. The poly-N-vinylpyrrolidone used for this purpose usually has a maximum K value of 90. It is disadvantageous in this process that the polymerization batch tends to foam and that the reactor volume can therefore not be fully utilized and problems arise in emptying the reactor completely.

It is an object of the present invention to reduce the foaming during the polymerization. It is a further object of the present invention to reduce the level of organic substances in the effluent from the polymerization batch, and to increase the internal water content of the expandable styrene polymers.

We have found that, surprisingly, these objects can all be achieved by using a particularly high-molecular-weight poly-N-vinylpyrrolidone.

The invention accordingly provides a process for the preparation of expandable styrene polymers by polymerizing styrene, if desired together with up to 50 % by weight of other $\alpha,\beta$-olefinically unsaturated compounds, in aqueous suspension in the presence of poly-N-vinyl-pyrrolidone as protective colloid and with addition of a $C_3$–$C_6$-hydrocarbon as blowing agent and, if desired, conventional additives in effective amounts before, during or after the polymerization, wherein the aqueous phase contains from 0.05 to 0.3% by weight of poly-N-vinylpyrrolidone having a K value of from 100 to 150.

With respect to the starting monomers, the blowing agent, the additives and the procedure, the novel process does not differ from conventional processes.

For the purposes of the present invention, styrene polymers are polystyrene and copolymers of styrene with other $\alpha,\beta$-olefinically unsaturated compounds which contain 50 parts by weight or more of styrene in copolymerized form. Examples of suitable comonomers are $\alpha$-methylstyrene, ring-halogenated styrenes, ring-alkylated styrenes, acrylonitrile, esters of acrylic or methacrylic acid with alcohols having from 1 to 8 carbon atoms, N-vinyl compounds, such as vinylcarbazole, maleic anhydride or small amounts of compounds which contain two polymerizable double bonds, such as butadiene, divinyl-benzene or butanediol diacrylate.

The molding materials contain as blowing agent from 1 to 10% by weight, preferably from 3 to 8% by weight, of a $C_3$- to $C_6$-hydrocarbon, such as propane, butane, isobutane, n-pentane, i-pentane, neopentane and/or hexane, preferably a commercially available pentane mixture.

The styrene polymers may also contain conventional additives which provide the expandable products with certain properties. Examples which may be mentioned are flameproofing agents based on organobromine or organochlorine compounds, which may also be in the form of microcapsules having a styrene-insoluble coating, such as trisdibromopropyl phosphate, hexabromocyclododecane and chlorinated paraffin, and synergists for flameproofing agents, such as dicumyl peroxide and highly labile organic peroxides; furthermore antistatics, stabilizers, dyes, lubricants, fillers and substances which have an anti-adhesive effect during prefoaming, such as zinc stearate, melamine-formaldehyde condensates or silica, and agents for shortening the demolding time on final foaming, eg. glycerol esters or hydroxycarboxylates. Depending on the intended effect, the additives may be distributed homogenously in the particles or in the form of a surface coating.

The suspension polymerization of styrene is known per se and described in detail in Kunststoff-Handbuch, Volume V, "Polystyrol", Carl Hanser-Verlag, pages 679 to 688. In this process, styrene is generally suspended in water, if appropriate together with the above-mentioned comonomers, and conventional organic or inorganic suspension stabilizers, preferably poly-N-vinylpyrrolidone, are added.

The styrene polymers according to the invention are prepared by polymerizing styrene in aqueous suspension, if appropriate together with up to 50% by weight of the abovementioned comonomers, the above-described blowing agents and, if desired, conventional additives being added in effective amounts before, during or after the polymerization.

The polymerization can also be carried out, as described in EP-B 106 129 and DE-A 39 21 148, in the presence of a small amount of a conventional chain-transfer agent, which regulates the molecular weight. The regulator used is preferably tert-dodecyl mercaptan.

Styrene polymers which contain from 0.1 to 2% by weight, preferably from 0.15 to 1.5% by weight, of copolymerized acrylonitrile give foams which are substantially free from shrinkage. These properties are also exhibited by a mixture of from 95 to 99.5% by weight of polystyrene and from 0.5 to 5% by weight of a styrene-soluble styrene-acrylonitrile copolymer if the total content of acrylonitrile in the mixture is from 0.1 to 2% by weight, preferably from 0.15 to 2% by weight.

Styrene polymers which contain from 3 to 20% by weight, preferably from 5 to 15% by weight, of copolymerizable acrylonitrile give foams having high oil resistance. This advantageous property is also exhibited by a mixture of from 50 to 85% by weight of polystyrene and from 15 to 50% by weight of a styrene-soluble styrene-acrylonitrile copolymer if the total content of acrylonitrile in the mixture is from 3 to 20% by weight, preferably from 5 to 15% by weight. Mixtures of this type are easily prepared by dissolving the intended amount of the styrene-acrylonitrile copolymer in styrene before the polymerization.

Styrene polymers which contain from 2 to 15% by weight, in particular from 3 to 12% by weight, of maleic acid or maleic anhydride as comonomer give foams with high heat distortion resistance. These styrene polymers are easily prepared by polymerizing a commercially available styrene-maleic anhydride copolymer in styrene.

Other suitable additives are poly(2,6-dimethyl)-1,4-phenylene ether and poly-1,4-phenylene sulfide. In amounts of from 1 to 20% by weight, based on component a), these additives increase the heat distortion resistance of the foam.

According to German patent application P 39 15 602.8-44, other suitable additives are styrene-soluble elastomers, which increase the elasticity of the foam.

It is essential to the invention that the suspension polymerization is carried out in the presence of particularly high-molecular-weight poly-N-vinylpyrrolidone as suspension stabilizer (protective colloid). The aqueous phase of the polymerization batch should contain from 0.05 to 0.3% by weight, preferably from 0.1 to 0.3% by weight, in particular from 0.15 to 0.25% by weight, of poly-N-vinylpyrrolidone having a K value (Fikentscher, cf. DIN 53 726) of from 100 to 150, preferably from 100 to 130, in particular from 105 to 120.

The poly-N-vinylpyrrolidone is generally prepared in a conventional manner by polymerizing N-vinylpyrrolidone in aqueous solution at elevated temperature using conventional free-radical formers as catalyst (cf. EP-B 104 042). The use of tert-butyl peroxy-2-ethylhexanoate or tert-butyl peroxy-3,5,5-trimethylhexanoate has proven successful for achieving high K values.

After addition of the catalyst, the batch is generally heated slowly, ie. over the course of about 1 to 3 hours, to from 80 to 100° C and kept at this temperature for from 2 to 6 hours until the residual monomer content is less than 1%, preferably less than 0.2%, in particular less than 0.1%.

In the examples, parts are by weight.

EXAMPLE 1

Preparation of poly-N-vinylpyrrolidone (K value 105)

6400 parts of water, 1600 parts of N-vinyl-pyrrolidone and 1.6 parts of tert-butyl peroxy-2-ethyl-hexanoate are introduced into a stirred reactor. The mixture is inerted using nitrogen and warmed to 50° C. over the course of one hour, then warmed to 85° C. in a regulated manner over 6 hours and subsequently kept at 5° C. for 2 hours.

The polymer has a K value of 105, and the residual monomer content is 0.02%, based on the polymer.

EXAMPLE 2

Preparation of poly-N-vinylpyrrolidone (K value 114)

The procedure is as in Example 1, but only 4 parts of tert-butyl peroxyethylhexanoate are used.

The polymer has a K value of 114, and the residual monomer content is 0.2%.

EXAMPLE 3

A mixture of 200 parts of water, 0.1 part of sodium pyrophosphate and 0.1 part of magnesium sulfate, 205 parts of styrene, 14 parts of pentane, 0.5 part of tert-butyl perbenzoate, 0.25 part of dibenzoyl peroxide, 1.4 parts of hexabromocyclododecane and 4 parts of a 10% strength aqueous solution of polyvinylpyrrolidone (K value 105), prepared as in Example 1, is heated to 90° C. with stirring under a nitrogen atmosphere in a pressure-tight stirred reactor, subsequently heated to 120° C. over the course of 5 hours and kept at 120° C. for 5 hours. After cooling, the suspension has very little foaming, which particularly facilitates emptying of the reactor.

A comparative batch using polyvinylpyrrolidone (K value 90) exhibits considerable foaming in the suspension after the polymerization, making emptying of the reactor much more difficult.

EXAMPLE 4

The procedure was as in Example 3, but a reduced amount of 3 parts of a 10% strength solution of polyvinylpyrrolidone (K value 105) prepared as in Example 1, was used as the protective colloid.

After cooling, the suspension has very little foaming, which particularly facilitates emptying of the reactor. The bead polymers obtained, having a mean particle diameter of about 1 mm, are circular and without deformations.

A comparative batch using polyvinylpyrrolidone of K value 90, even with the reduced amount of 3 parts of a 10% strength aqueous solution, exhibits considerable foaming in the suspension after the polymerization, and emptying of the reactor is thus much more difficult. Some of the beads of the polymer obtained, having a mean particle diameter of about 1 mm, are deformed, which indicates the commencement of an unsatisfactory protective colloid action.

EXAMPLE 5

The procedure was as in Example 3, but 4 parts of a 10% strength solution of polyvinylpyrrolidone (K value 114), prepared as in Example 2, were used as the protective colloid.

After cooling, the suspension exhibits very little foaming, which particularly facilitates emptying of the reactor. The bead polymers obtained, having a mean particle diameter of about 1 mm, have an increased internal water content of about 2%.

A comparative batch using polyvinylpyrrolidone of K value 90 exhibits considerable foaming in the suspension after the polymerization, and emptying of the reactor is thus much more difficult. The bead polymers obtained, having a mean particle diameter of about 1 mm, have a conventional internal water content of about 1%.

We claim:

1. A process for the preparation of an expandable styrene polymer by polymerizing styrene, alone or together with up to 50% by weight of another $\alpha,\beta$-olefinically unsaturated compound, in aqueous suspension in the presence of poly-N-vinylpyrrolidone as protective colloid and with addition of a $C_3-C_6$-hydrocarbon as blowing agent, wherein the aqueous phase contains from 0.05 to 0.3% by weight of poly-N-vinylpyrrolidone having a K value of from 100 to 150.

2. The process according to claim 1, wherein an additive selected from the group consisting of flameproofing agents, antistatics, stabilizers, dyes, lubricants, fillers, anti-adhesives and demolding time shorteners are added before, during or after polymerization.

* * * * *